United States Patent [19]

Ward et al.

[11] Patent Number: 4,839,866
[45] Date of Patent: Jun. 13, 1989

[54] CASCADABLE FIRST-IN, FIRST-OUT MEMORY

[75] Inventors: Morris D. Ward, Garland; Kenneth L. Williams, Dallas, both of Tex.

[73] Assignee: Texas Instruments Incorporated, Dallas, Tex.

[21] Appl. No.: 55,669

[22] Filed: May 29, 1987

[51] Int. Cl.[4] .................. G11C 7/00; G11C 8/00; G11C 19/00

[52] U.S. Cl. ..................... 365/221; 365/78; 365/236; 365/189.01; 365/189.08

[58] Field of Search ............ 365/221, 189, 236, 78

[56] References Cited

U.S. PATENT DOCUMENTS 4,507,760  3/1985  Fraser .................... 356/221 X
4,694,426  9/1987  Mason .................... 365/78 X Primary Examiner—Terrell W. Fears
Assistant Examiner—Alfonso Garcia
Attorney, Agent, or Firm—Michael E. Melton; Leo N. Heiting; Melvin Sharp

[57] ABSTRACT

A cascadable first-in, first-out memory unit (11, 12, 13) has a load/unload control (152) for write-addressing and read-addressing selected memory locations within its memory array (82). A write pointer (110, 112, 120) keeps track of the number of write operations that have occurred in the selected memory unit, and a read pointer (130, 132, 142) does the same for the number of read operations. When the number of write operations performed since a last reset pulse (416) equals the number of memory locations in the memory array (82), write control passes to the next succeeding FIFO memory unit by a descending transition of an output control signal (444). Read control is passed to the subsequent FIFO by an ascending transition (470) of the same output control signal. Combination first load, master reset and output control circuitry (54–58, 192) is provided to select the first memory unit (11) for read and write operations, and to disable the outputs (18) of all of the FIFO memory units independent of the master reset signal (55).

24 Claims, 4 Drawing Sheets

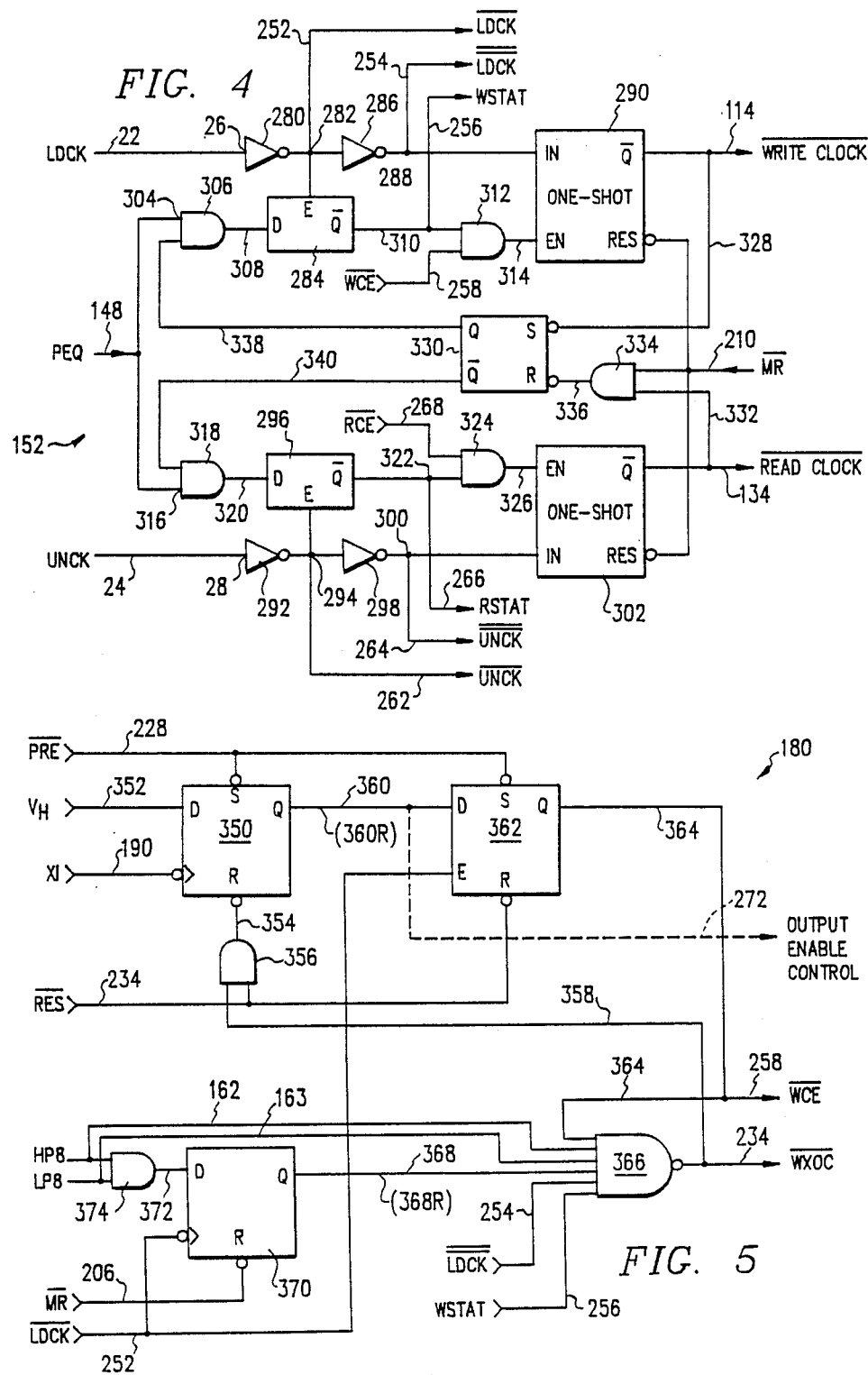

CASCADABLE FIRST-IN, FIRST-OUT MEMORY

TECHNICAL BACKGROUND

The present invention relates generally to first-in, first-out (FIFO) memories, and more particularly relates to FIFO memories for use in a cascaded system.

BACKGROUND OF THE INVENTION

In digital systems, it is frequently necessary to interface different parts of a system which handle data at different rates. For example, it is often desirable to interface a disk drive with a central processing unit (CPU). Commonly, a first-in, first-out (FIFO) memory is used to perform this interface. A FIFO memory is a storage device that allows data to be written into and read from at different data rates.

A need has arisen in the industry for FIFO structures having a large amount of storage capacity. While single-chip FIFs have increased recently in their size to larger dimensions such as 64 words×9 bits, these enlarged single-chip FIFOs are still not large enough for many FIFO applications. FIFO systems have therefore been developed that connect several FIFO parts together in a cascaded FIFO memory system.

Certain disadvantages have however arisen in connection with these recent cascadable FIFO systems. FIFOs typically perform read and write operations from and to their memories in a synchronous manner, i.e. according to a clock pulse train. In certain recent devices, a read operation is performed responsive to an input negative-going transition of an unloading clock signal, and a write operation is performed responsive to an input negative-going transition of a loading clock signal.

The outputs of these conventional devices are disabled during the positive edge of the unloading clock. When these parts are cascaded together, all of the parts in the cascaded sequence are disabled on the positive edge of the clock. Therefore, there exist periods when nothing appears on the output bus from the cascaded FIFO system. A floating output bus therefore exists during half of the clock cycle.

Another problem that exists with conventional cascadable FIFO memories is the manner in which they transfer read and write control among their single-chip units. In conventional FIFO memories, read control is transferred pursuant to both an ascending and a descending transition of a control signal pulse, and write control passes from one part to another pursuant to an ascending and a descending transition of a separate control signal pulse. The requirements of transferring both read and write control using two different signals with complete pulse forms may act as a limitation on the overall speed of the FIFO system.

Therefore, a need has arisen in the industry for a cascadable FIFO memory system whereby control is passed from one chip to another using a single signal for both write and read control. Further, a need has arisen in the industry for a cascadable FIFO part that has a disabling control separate from the high state of the unloading clock, such that the output bus from the system can be occupied with data substantially all of the time.

SUMMARY OF THE INVENTION

One aspect of the present invention comprises a first-in, first-out (FIFO) memory that is adaptable to be incorporated into a cascaded memory system that includes at least one other memory. The memory comprises a controller for enabling write operations responsive to a first transition of a control transfer input signal, and for enabling read operations responsive to a second, opposite transition of the control transfer input signal. The controller is operable to transmit a first transition of a control transfer output signal to the other memory responsive to a first predetermined state in the current memory, and is operable to transmit a second transition of the control transfer output signal to the other memory responsive to a second predetermined state in the current memory. The other memory will be enabled to perform write operations after receiving the first transition, and to perform read operations after receiving the second transition. A principal advantage of the invention inheres in the use of opposed transitions of a single control transfer signal, avoiding the use of complete signal pulses or multiple signal lines for this purpose.

A further technical advantage of the invention is provided by the single transfer control signal being used to transfer control for both read and write operations. Since only a single transition is used to transfer control rather than a whole pulse, the memory system may be operated at a faster rate.

A related aspect of the invention concerns the character of the aforesaid first and second predetermined states, wherein the first-in, first-out memory includes a counter for counting the number of write and read operations. After counting a predetermined number of write operations, the counter will cause the generation of the first transition of the control transfer output signal. The counter will cause the generation of the second transition in the control transfer output signal responsive to counting a predetermined number of read operations. The predetermined number of write and read operations preferably each equal the number of memory locations in the current FIFO memory. The invention therefore presents a second advantage in that write and read control are transferred to the next memory regardless of the relative position of the write and read pointers; the FIFO memory is operated to behave exactly like a section of a larger FIFO memory, and will pass control to the next FIFO memory regardless (in general) of how much of its capacity is presently being used.

Another write and read control transfer system could be devised whereby the second FIFO is accessed only after the first FIFO is completely full (in the case of write operations) or is completely empty (in the case of read operations). This, however, is a system that requires a more complex accounting system. The very simple accounting and control transfer system of the present invention therefore presents a further advantage over other control transfer schemes.

A further aspect of the invention comprises a control transfer circuit for use in a FIFO memory unit that in turn is used in a cascaded memory system. The control transfer circuit comprises a write controller for receiving a first transition of a control transfer input signal from a last memory unit. The write controller is operable to store a write control state responsive to this first transition. The control transfer circuit further comprises a read controller for receiving a second transition of the control input signal, which transition is of opposite polarity from the first transition. The read controller stores a read control state responsive to receiving the second transition.

The current memory unit is operable to transmit a control transfer output signal to the next memory unit in order to enable write and read operations therein. The write controller is operable to erase the write control state and generate a first transition of the control transfer output signal for transferring write control to the next unit, the first transition generated responsive to a first predetermined state occurring in the current memory unit. The read controller is operable to erase the read control transfer state and generate a second transition of the control output signal for transferring read control to the next unit, the second transition generated responsive to a second predetermined state in the memory unit. The storage of the predetermined states within the memory unit provides an advantage in that the transfer of control from the current memory unit to the next memory unit is permanent, subject only to the eventual sequential return of control to the current unit by the last memory unit or a reset.

Yet another aspect of the invention comprises a FIFO memory with a combination first-load and three-state control system. The system is operable to place a selected one of the cascaded FIFO memories in an active state, while placing the remainder of the cascaded FIFO memories in an inactive state. The provision of a separate tristate control, apart from the external load clock or unloading clock signal, provides a technical advantage in that, during normal operation, data can be transmitted on the system's output bus at all times.

BRIEF DESCRIPTION OF THE DRAWINGS

Further aspects of the invention and their advantages will be discerned from the following detailed description taken in conjunction with the appended drawings in which:

FIG. 4 is a more detailed schematic logic diagram of the load/unload control circuit block shown in FIGS. 2 and 3;

FIG. 5 is a more detailed schematic electrical diagram of the write cascade control block shown in FIG. 3.

DETAILED DESCRIPTION

Figure 1:
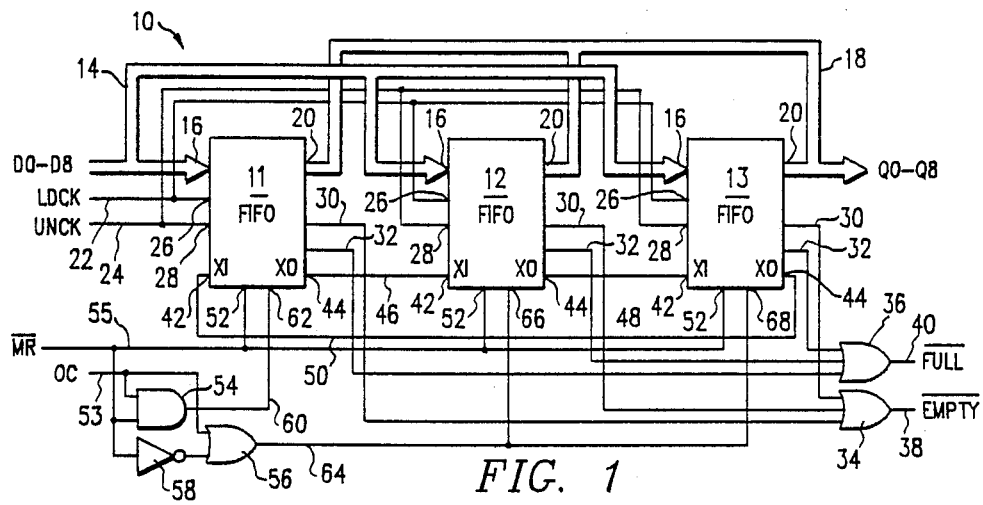
FIG. 1 is a schematic electrical block diagram showing three first-in, first-out memories of the invention connected in a cascaded system together with certain peripheral cascading circuitry.

Referring first to FIG. 1, a cascaded FIFO system is indicated generally at 10. The illustrated cascaded system 10 comprises three FIFO memories 11–13, it being understood that such a system could employ many more such memories. Each FIFO memory unit 11–13 is preferably comprised of a single integrated circuit. An input data bus 14, in the illustrated embodiment comprising nine data bit lines DO–DB, is input from a first connected device (not shown). Bus 14 has an input 16 into each memory unit 11–13. An output data bus 18, in the illustrated embodiment comprising nine bit lines Q0–Q8, is connected to respective outputs 20 of FIFO memory units 11–13 and is connected to a second connected device (not shown) for reading data from one of the memory units 11–13.

System 10 is further provided with an external load clock (LDCK) line 22 and an unclock (UNCK) line 24. Each FIFO 11–13 has a LDCK terminal 26 and an UNCK terminal 2S for receiving the LDCK and UNCK signals, respectively.

As will be explained in more detail below, the LDCK signal is provided to actuate a write operation at a selected location in a selected memory unit 11–13. Similarly, the UNCK signal is used to actuate a read operation from a selected memory location of a selected memory unit 11–13. Although LDCK and UNCK are connected to each memory unit 11–13, only one memory unit 11–13 will be enabled to respond to a LDCK pulse, and only one memory unit 11–13 will be enabled to respond to an UNCK pulse.

Each memory unit 11–13 is operable to generate a $\overline{\text{EMPTY}}$ status flag on an output signal line 30 responsive to all of its memory locations therein being empty, and a $\overline{\text{FULL}}$ status flag on a respective output line 32 responsive to all of its memory locations being full. Each $\overline{\text{EMPTY}}$ signal line 30 is connected to a system $\overline{\text{EMPTY}}$ OR gate 34, and each $\overline{\text{FULL}}$ line 32 is connected as an input to a system $\overline{\text{FULL}}$ OR gate 36. As used herein, signal names having a bar over them are preferably active in their low or "zero" state, while signal names with no bars are active in their high or "one" state.

System $\overline{\text{EMPTY}}$ gate 34 will generate a system $\overline{\text{EMPTY}}$ signal on an output 38 thereof responsive to every line 30 being low, and system $\overline{\text{FULL}}$ gate 36 will generate a system $\overline{\text{FULL}}$ signal on its output 40 responsive to every $\overline{\text{FULL}}$ signal line 32 being low.

Each FIFO 11–13 has an control transfer-in, or XI, terminal 42 and a control transfer-out, or XO, terminal 44. The XO terminal 44 of FIFO 11 is connected by a line 46 to an XI terminal 42 of FIFO 12. The XO terminal 44 of FIFO 12 is connected by a line 4S to an XI terminal 42 of FIFO 13. The XO terminal 44 of FIFO 13 is connected by a line 50 back to the XI terminal 42 of FIFO 11, thus creating a connected ring. Lines 46, 48 and 50 are each operable to transmit write and read control transfer signals from their respective XO terminals to their respective XI terminals. The structure and operation of the XI/XO control transfer process will be described in more detail in conjunction with FIGS. 3 and 5 below.

Each FIFO 11–13 has a reset terminal 52 that is connected to a master reset($\overline{\text{MR}}$) signal line 55. The $\overline{\text{MR}}$ signal is operable to reset FIFO memories 11–13 to an initial empty condition, as will be described in more detail with reference to FIGS. 2 and 3.

An output control signal (OC) line 53 is connected to an input of an AND gate 54, and is also connected to the input of an OR gate 56. Master reset line 55 is connected to a second input of AND gate 54 and also to an input of an inverter 58. The output of inverter 58 is connected as an input to OR gate 56. An output 60 of AND gate 54 is connected to a first load/output control ($\overline{\text{FL}}$/OC) input 62 of first FIFO memory 11.

An output 64 of OR gate 56 is connected to $\overline{\text{FL}}$/OC inputs 66 and 68 of respective FIFO memories 12 and 13.

The $\overline{\text{MR}}$ signal is operable to clear the memories of each of FIFO memory units 11–13 and to generate a system $\overline{\text{EMPTY}}$ flag on output signal line 38. The $\overline{\text{MR}}$ signal further causes each of FIFOs 11-13 to ignore UNCK signals appearing at their respective inputs 28.

The $\overline{MR}$ signal line 55 is further preferably used in connection with the OC signal line 53 in order to determine which of the FIFOs 11-13 will first accept reads and writes. In the embodiment shown in FIG. 1, FIFO 11 will be the FIFO that is selected to perform read and write operations. FIFOs 12 and 13 will in the meanwhile remain disabled until control sequentially passes to them via line 46 and then line 48. As will be explained in detail in conjunction with FIGS. 3-5 below, while $\overline{MR}$ line 55 is low, and a high condition exists on the OC external input line 53, read and write operations for the first FIFO memory unit 11 will be enabled, while read and write operations for memory units 12 and 13 will be disabled. This is because a low state will appear on line 60, while a high state will appear on line 64 and at inputs 66 and 68. This in turn results from the low state of $\overline{MR}$ being inverted by inverter 58 and connected as an input to OR gate 56. Therefore, inputs 66 and 68 will be high at any time that $\overline{MR}$ line 55 is low. On the other hand, input 62 of FIFO 11 will be high only when both the OC signal line 53 is high and $\overline{MR}$ line 55 is high.

FIG. 1 also illustrates how the outputs of all three memories 11-13 can be put into a high-impedance state or "tristate" condition at some point during system 10's operation. During normal operation, the $\overline{MR}$ signal will be high. Therefore, the $\overline{MR}$ input of OR gate 56 will be low, and one input of AND gate 54 will be high. In this condition, if the OC signal is high, then each of inputs 62, 66 and 68 will be high, and a selected one of the three FIFO's 11-13 will be enabled for read and write operations, assuming the occurrence of other necessary conditions detailed below. If, on the other hand, OC signal line 53 is low, then all three inputs 62-68 will be low effectively disabling all three FIFOs 11-13.

Figure 2:
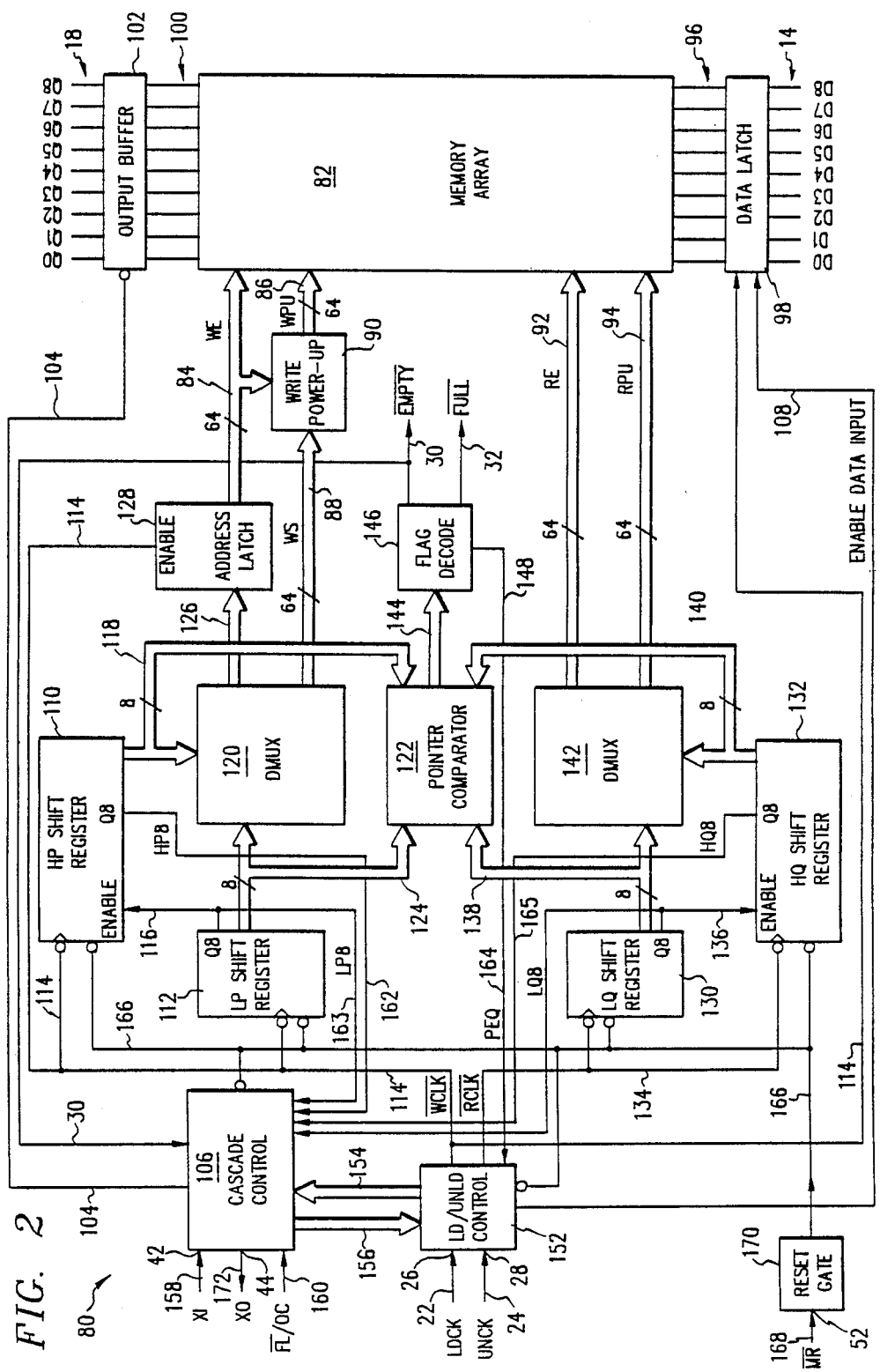
FIG. 2 is a schematic electrical block diagram of one FIFO memory according to the invention.

Referring now to FIG. 2, a schematic electrical diagram of a FIFO 80 according to the invention is illustrated. In the FIGS. like numbers identify like components wherever possible. FIFO 80 comprises a memory array 82 which, in the illustrated embodiment, has 64 word locations, each word location comprising nine bits for a total of 576 cells. Array 82 is preferably built using TTL architecture, as is the rest of FIFO 80. Each word location inside array 82 is independently addressable, either for a write operation or for a read operation. Array 82 receives a 64-line write enable bus (WE) 84, with each of the 64 lines corresponding to a separate word location. Each word location also receives a line of the 64-line write power-up bus (RPU) 86. A selected write power-up line of bus S6 will go high responsive to either a high state of a selected write enable line of bus S4, or a high state of a selected write select (WS) line of 64-line write select bus 88. Write enable bus 84 and write select bus 88 together are input into a write power-up circuit 90 for generating a high state on a selected one of the lines comprising write power-up bus 86.

Array 82 also receives a 64-line read enable (RE) bus 92 and a 64-line read power-up (RPU) bus 94. A selected one of the read enable lines making up bus 92 addresses a selected word location in array 82, and a corresponding selected one of read power-up lines comprising bus 94 powers up the addressed read location so that a read operation may be effected. Individual write power-up lines 86 and read power-up lines 94 are used in preference to powering up the entire array 82 in order to save power.

Data is written into array 82 on a plurality of internal bit lines 96, which are in turn connected to a data latch 98. Data latch 98 in turn receives a plurality of external data inputs DO-DS which together make up the external data input bus 14 shown in FIG. 1.

Responsive to a read operation, data from a selected word appear on internal output bit lines 100 and are stored in an output buffer 102. When output buffer 102 is enabled, these data will appear on external read bit lines Q0-Q8 which together form external output data bus 18. Output buffer 102 is enabled via line 104, which in turn is an output of a cascade control section 106. A circle is placed on line 104 at its input to output buffer 102 to indicate that a low transition of a signal appearing on line 104 will disable output buffer 102. A similar code is used throughout the rest of FIGS. 2-5. In the case of output buffer 102, a low state on line 104 will cause a "tristate" or high-impedance state to exist on external output lines Q0-Q8.

Input data latch 98 is enabled by an enable data input (EDI) line 108 and $\overline{WCLK}$ line 114. A high state on line 108 and 114 will enable data latch 98 to accept data on input bit lines 14.

One line of write enable bus 84 is selected pursuant to a stored write address. In the illustrated embodiment, a higher-order write address bit (HP) of the write address is stored in a ring counter or higher-order shift register 110, and a lower-order address bit (LP) is stored in lower-order shift register or ring counter 112. Where array S2 has 64 addressable locations, registers 110 and 112 preferably each comprise eight register locations or flip flops (not shown). A higher-order address bit is stored in one of the higher-order shift register locations or flip-flops, while a lower-order address bit is stored in one of the lower-order shift register locations or flip-flops.

The lower-order address bit in shift register 112 is incremented from a current register location to a next register location responsive to a low transition on write clock ($\overline{WCLK}$) line 114. Successive pulses on $\overline{WCLK}$ line 114 will cause the lower-order address bit to increment from a "one" location through successive locations to an "eight" location, and then back to the "one" location again. While the lower-order address bit is in the "eight" location, it enables, through a signal line 116, higher-order shift register 110 to accept a $\overline{WCLK}$ pulse on line 114. This will cause the higher-order address bit to increment from a current higher-order register location to a next higher-order register location. Thus, the write address is stored by a pair of dual-tier shift registers or ring counters 110 and 112.

HP shift register 110 outputs a higher-order address bit bus 118, which is input into a demultiplexer 120 and also into a pointer comparator 122. Likewise, LP shift register 112 outputs an eight-line address bit bus 124 that is input into demultiplexer 120 and pointer comparator 122. For any particular selected write address, one of the address bit lines making up bus 118 and one of the address bit lines making up bus 124 will be high. The multiplexer 120 senses which combination of the lines making up buses 118 and 124 are high, and outputs the result on a write signal output bus 126.

Bus 126 preferably has 64 lines, one of which will be high. Bus 126 is input into an address latch section 128. Address latch section 128 is preferably comprised of 64 address latches, each of which will be enabled to store an input address state on bus 126 by a high-going transition on $\overline{WCLK}$ line 114. The stored address state inside address latch section 128 will be used to address a selected memory location in array 82 responsive to the next low-going transition of $\overline{\text{WCLK}}$ line 114. Thus, the invention incorporates a simultaneous memory-write address scheme, wherein a memory location is write-addressed while the write pointer comprised of registers 110 and 112 is being incremented to the next address location.

FIFO 80 further includes a read address pointer that is comprised of a lower-order read (LQ) shift register or ring counter 130 and a higher-order read (HQ) shift register or ring counter 132. Shift registers 130 and 132 are organized in a manner analogous to respective shift registers 112 and 110, and store respective low-order (LQ) and high-order (HQ) read address bits at a respective selected low-order register location and in a respective selected high-order register location therein. A read clock ($\overline{\text{WCLK}}$) line 134 is input into both registers 130 and 132. A low-going transition on $\overline{\text{WCLK}}$ line 134 causes the lower-order address bit to increment from a current register location to a next location, incrementing from an initialized "one" location through intermediate locations until an "eight" position is reached therein. Responsive to the lower-order read address bit being stored in the "eight" position, a high signal will be generated on a clock enable line 136. A high condition on this line will allow shift register 132 to accept a low-going transition on $\overline{\text{RCLK}}$ line 134. Shift register 130 outputs a lower-order read address bit signal on one of eight lower-order read address bit lines making up output bus 134. Similarly, a selected one of the eight output lines making up output bus 140 will be energized by the current location of the higher-order read address bit inside shift register 132. Bus 138 is input into a read demultiplexer 142 and also into pointer comparator 122. Bus 140 is also input into demultiplexer 142 and pointer comparator 122. One line each of buses 138 and 140 will be high, and demultiplexer 142 acts to decode the combination of these high lines to select one of 64 read address locations. A high signal is generated by demultiplexer 142 on read enable bus 92 and read power-up bus 94 responsive to the selected combination.

The illustrated embodiment is built for a 64-word × 9-bit memory array and dual-tier read pointer and a dual-tier write pointer. While the illustrated embodiment is preferred, the invention is in no manner limited thereto. For instance, the memory array 82 can be of another size, and the write and read pointers can comprise only a single stage each. The present invention has application to any FIFO that increments from a current read address location to a next read address location in a synchronous manner, and likewise has application to any FIFO that increments from a current write address location to a next write address location using a write clock signal.

Pointer comparator 122 compares the write address input on busses 118 and 124 to the read address input on busses 138 and 140. Comparator 122 is operable to determine whether the HP and HQ addresses are one location away from each other or are at the same location and whether the LP and LQ addresses are one location away from each other or are at the same location. Appropriate signals are output responsive thereto on an output bus 144. Bus 144 is input into a flag decoder section 146. Flag decoder section 146 receives the signals input on bus 144 and determines whether array 82 is completely empty or completely full, based on the difference of the present and immediate past locations of the read and write pointers. If decoder section 146 determines that the array is empty, a FIFO $\overline{\text{EMPTY}}$ status flag is transmitted on line 30. If decoder 146 determines that array 82 has data written into every one of its word locations, a $\overline{\text{FULL}}$ status flag is transmitted on line 32. The read pointer (Q) will be equal to the write pointer (P) in either event, and therefore in either event flag decoder 146 will transmit a high state on P equals Q (PEQ) line 148.

$\overline{\text{EMPTY}}$ status flag line 30 is further connected to cascade controller 106. A low state on line 30 will cause controller 106 to disable output buffer 102 through line 104. PEQ line 148 is connected as an input to a load/unload control section 152.

A load/unload control section 152 is responsible for generating $\overline{\text{WCLK}}$ pulses on line 114, and RCLK pulses on line 134. If load/unload control section 152 is enabled to do so, it will transmit a $\overline{\text{WCLK}}$ pulse on line 114 responsive to the receipt of a LDCK pulse on input line 22, and will likewise transmit a $\overline{\text{RCLK}}$ pulse on line 134 responsive to the receipt of an UNCK pulse on input line 124. A low state on EDI line 108 is also generated responsive to the rising input of a LDCK pulse on line 22.

Cascade control block 106 is connected to the load/unload control block 152 by signal buses 152 and 156, each of which comprise a plurality of signal lines. The structure and operation of load/unload control section 152 will be described in more detail in conjunction with FIGS. 3 and 4, and the structure and operation of cascade control section 106 will be described in more detail in conjunction with FIGS. 3 and 5. Cascade controller 106 enables or disables the operation of load/unload control section 152 responsive to predetermined states of the following signals: an external transfer control signal (XI) input on line 158; first load/output control (FL/OC) signal input on line 160; an HP8 signal received on line 162; an LP8 signal received on line 163; an HQS signal received on line 164; an LQ8 signal received on line 165; and a reset signal received on reset line 166. High states of both HP8 and LP8 are transmitted from HP shift register 110 and LP shift register 112 responsive to the last memory location in array S2 being addressed for a write operation. Similarly, high states of both HQ8 and LQ8 are transmitted on lines 164 and 165 responsive to the last word location in array 82 being addressed for a read operation. As will be explained in more detail below, the HP8, LP8, HP8 and LQ8 signals are used in transferring control from the current FIFO memory to the next FIFO memory in the cascaded chain.

An externally generated $\overline{\text{MR}}$ line 16B is input into a reset circuit 170. Reset circuit 170 is operable to generate a reset pulse on line 166, which in turn is used to reset cascade control 106, load/unload control 152, and registers 110, 112, 130, and 132.

Cascade controller 106 is also operable to generate a transfer control output (XO) signal on a line 172, which is connected to the next FIFO memory in the cascaded system.

Figure 3:
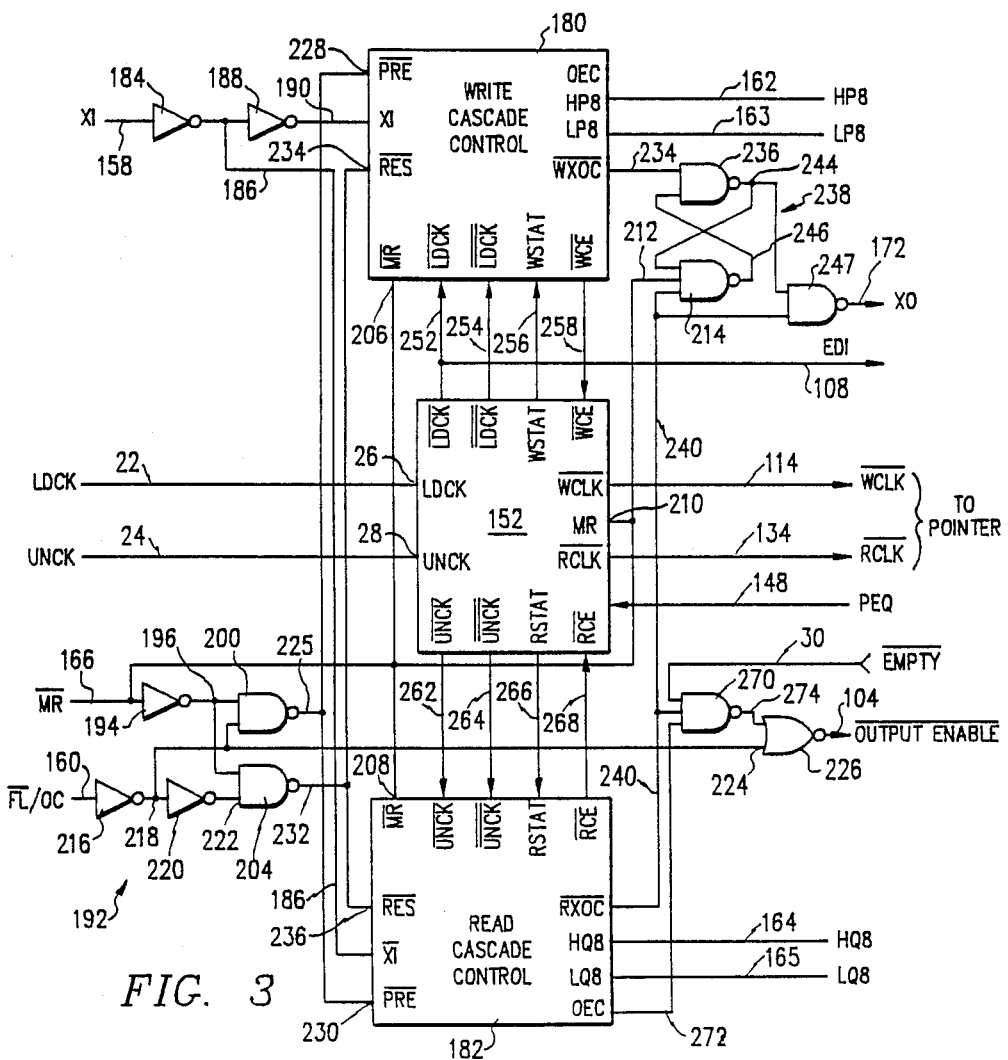
FIG. 3 is a schematic electrical block diagram of preferred cascade control, load/unload control, and reset circuitry according to the invention.

Cascade control block 106, load/unload control block 152 and reset block 170 are shown in more detail by the logic diagram shown in FIG. 3. Cascade controller 106 (FIG. 2) is actually comprised of a write cascade controller 180 and a read cascade controller 182. Write cascade controller 180 controls load/unload control block 152 with respect to its generation of $\overline{\text{WCLK}}$ pulses on line 114, and read cascade control 182 controls load/unload control 152 with respect to its generation of $\overline{RCLK}$ pulses on line 134.

Control transfer input signal XI is input on a line 158 to an inverter 184. The inverted signal $\overline{XI}$ is input into read cascade controller 182 on line 186. The $\overline{XI}$ signal is once again inverted by an inverter 188 and is input on line 190 to write cascade controller 180. External LDCK pulses are input on line 22 to a LDCK terminal 26 of load/unload control 152, and UNCK pulses are received at an UNCK terminal 28 of load/unload control 152 from an external line 24.

Each FIFO memory unit in the cascaded system (such as FIFOs 11–13, FIG. 1) incorporates a master reset output control logic circuit indicated generally at 192. An $\overline{MR}$ line 166 is received by an inverter 194. An output node 196 of inverter 194 is connected to an input of a first NAND gate 200. Output 196 is further connected to an input of a second NAND gate 204. Master reset line 166 is further connected to an $\overline{MR}$ terminal 206 of write cascade controller 180, an $\overline{MR}$ terminal 2OS of read cascade controller 182, an $\overline{MR}$ terminal 210 of load/unload control 152, and an input 212 of a control transfer out (XO) signal latch NAND gate 214.

A first load and output control ($\overline{FL/OC}$) signal 160 is input into a buffering inverter 216. An output 218 of buffer 216 is connected to an input of a second inverter 220. An output 222 of inverter 220 is input into NAND gate 204. Output 218 is further connected to an input of NAND gate 200 and to an input 224 of an output control NOR gate 226.

An output 225 of NAND gate 200 is connected to a preset ($\overline{PRE}$) input 22S of write cascade controller 180, and a $\overline{PRE}$ input 230 of read cascade controller 182. As will be explained in more detail in conjunction with FIG. 5 below, a low state at preset inputs 228 and 230 will operate to enable load/unload control 152 to issue write and read operation signals, assuming that certain other conditions are met.

NAND gate 204 has an output 232 that is connected to a reset ($\overline{RES}$) input 234 of write cascade controller 180, and an $\overline{RES}$ input 236 of read cascade controller 182. As will be explained in more detail in conjunction with FIG. 5 below, a low state on reset inputs 234 and 236 will disable load/unload controller 152 from issuing write and read operation signals.

The operation of $\overline{MR}$ and output controller 192 will now be described in conjunction with FIGS. 1 and 3. When it is desired to reset FIFO memory units 11–13 to a starting condition, a low state is input on the $\overline{MR}$ line 55. For each of FIFOs 11–13, this low $\overline{MR}$ pulse appears on line 168, is buffered by gate 170, and is input into inverter 194. An inverted MR pulse is input into NAND gate 200 and NAND gate 204.

Referring particularly to FIG. 1, the $\overline{MR}$ line 55 is also input into an inverter 5S, where it is inverted and input into OR gate 56. Therefore, for both FIFO memory units 12 and 13, a high state will appear at their $\overline{FL/OC}$ inputs 160 (FIG. 3). This high state is inverted by inverter 216, and is output to input 224 of output enable NOR gate 226. The signal at node 218 is further inverted by inverter 220 and is input into input 222 of NAND gate 204. The signal at node 218 is also input into NAND gate 200. Since node 196 is high and node 218 is low, NAND gate 200 will transmit a high state on line 225, which is ignored by $\overline{PRE}$ input terminals 228 and 230. On the other hand, the twice-inverted $\overline{FL/OC}$ signal at 222 is high, as is the once-inverted $\overline{MR}$ signal at node 196. NAND gate 204 will therefore output a low signal on its output 232, which low signal will appear at $\overline{RES}$ inputs 234 and 236. As will be explained in more detail in conjunction with FIG. 5 below, this disables the output of $\overline{WCLK}$ pulses on line 114 and $\overline{RCLK}$ pulses on 134 by load/unload controller 152. FIFO memory units 12–13 will then in effect be disabled from performing read or write operations.

On the other hand and referring back to FIG. 1, the low $\overline{MR}$ pulse is input into AND gate 54, and therefore the output 60 of AND gate 54 will be low. Therefore, the $\overline{FL/OC}$ signal input to memory unit 11 on line 60 will be of an opposite polarity to the $\overline{FL/OC}$ signal input into memory units 12 and 13 on line 64. Referring again to FIG. 3, where the $\overline{FL/OC}$ signal is low at input 160, inverter gate 216 will invert the signal, producing a high state at node 218. The high state at node 218 is input into one of the inputs of NAND gate 200. Since the master reset at 166 is low, node 196 will be high. Since both inputs into NAND gate 200 are high, NAND gate 200 will output a low state on its output 225. This low state appears at $\overline{PRE}$ terminal 228 of write cascade controller 180 and $\overline{PRE}$ terminal 230 of read cascade controller 182. A low state appearing at preset terminal 228 will enable load/unload controller 152 to generate WCLK pulses on line 114, and a low state appearing at $\overline{PRE}$ terminal 230 will similarly enable load/unload controller 152 to generate $\overline{RCLK}$ pulses on line 134, assuming that certain other conditions are met. The enabling and disabling functions of controller 152 will be explained in more detail in conjunction with FIGS. 4 and 5. In sum, memory unit 11 (FIG. 1) is initially enabled to perform write and read operations in its memory, while memory units 12 and 13 are initially disabled.

A second function of memory unit control section 192 (FIG. 3), when taken in conjunction with external cascade control gates 54—55 (FIG. 1), is to provide for an output disabling means apart from the LDCK or UNCK commands, or the $\overline{MR}$ signal. Referring first to FIG. 1, output control signal line 53 is connected as an input into AND gate 54. Therefore, a low state on output control signal line 53 will be reflected in a low state on signal line 60. Where it is desired to disable the outputs apart from doing a reset operation, the reset signal will be high, and therefore, a low signal will result from inverter 58. Where the output control signal line 53 is also low, a low state will result on OR gate output 64. Therefore, a low $\overline{FL/OC}$ signal will be input to all three memory units 11–13.

Referring now to FIG. 3, the low $\overline{FL/OC}$ signal is input into inverter 216, where it is inverted. The high state at node 218 is input into input 224 of NOR gate 226. A low state will be output by gate 226 responsive to either of NOR gate 226's inputs being high. A low state on output enable line 104 is input into output buffer 102 (FIG. 2) which acts to put output lines Q0—Q8 in a high-impedance or tristate condition.

Returning to FIG. 3, write cascade controller 180 has a write transfer control signal ($\overline{WXOC}$) output line 234 which is connected as an input into a NAND gate 236 of a transfer control signal latch indicated generally at 238. Read cascade control block 182 similarly has a read transfer control signal ($\overline{RXOC}$) output line 240 that is connected as an input to NAND gate 214 of latch 238. An output 244 of NAND gate 236 is cross-connected as an input to NAND gate 214, and an output node 246 of NAND gate 214 is cross-connected as an input to NAND gate 236. Node 244 is further connected as an input into a NAND gate 247 which is responsible for issuing a control transfer output signal (XO) on output line 172.

Write cascade control 180 further receives the HP8 signal on line 162 from HP shift register 110 and the LP8 signal on line 163 from LP shift register 112 (FIG. 2). In the illustrated embodiment, there are 64 memory locations in the memory, and the addressed memory location is represented by a higher-order address digit and a lower-order address digit in a base 8 notation. The 64th memory array position is therefore represented when both signal HP8 is high and when signal LP8 is high.

Analogously, read cascade controller 182 receives the HQ8 signal on line 164 from HQ shift register 132 and the LQ8 signal on line 165 from LQ shift register 130. High states on both HQS and LQ8 indicate that the 64th and last memory location is being read-addressed.

A high state of both HP8 and LP8 will, in certain predetermined circumstances, cause a low transition of the $\overline{WXOC}$ signal to be input into NAND gate 236. Output node 244 will then go from low to high, and the high state will be input into gate 247. Node 246 will store a low state. Since RXOC line 240 is initialized high, output of XO line 172 will change from high to low. The high to low transition of XO is received by the next sequential memory unit, and enables write operations therein in a manner to be more completely explained in conjunction with FIGS. 4 and 5. $\overline{WXOC}$ will then return to a high state.

After sixty-four read operations have occurred since the current memory unit was enabled to perform read operations, HQ8 and LQ8 will both be high and signal $\overline{RXOC}$ will go low on line 240. The low state of line 240 is input both into NAND gate 247 and into NAND gate 214. Output 246 of gate 214 will in response go from low to high, and node 244 will go low in response. $\overline{RXOC}$ is input directly into NAND gate 247. Since both inputs of gate 247 are low XO will go high. Thus a low-to-high transition of the XO signal will be transferred to the next gate, and will enable read operations in the next memory unit. $\overline{RXOC}$ will subsequently return high, but XO will remain high because a low state is latched on node 244.

To perform its control of the "load" function of load-/unload control 152, write cascade controller 180 receives the following inputs from load/unload control 152: an inverted load clock line 252 ($\overline{LDCK}$), a twice-inverted $\overline{\overline{LDCK}}$ line 254, and a write status (WSTAT) line 256 that communicates whether write operations are disabled due to the memory unit being full. Write cascade controller 180 enables or disables load/unload control 152 through a write clock enable ($\overline{WCE}$) line 258.

$\overline{LDCK}$ line 252 is also the enable data input (EDI) line 108 that in turn is connected to data latch 98 (FIG. 2) for enabling the input of data thereinto.

The "unload" function of load/unload control 152 is controlled by read cascade controller 182. Signal lines connecting load/unload control 152 to read cascade control 182 include an inverted $\overline{UNCK}$ line 262, a twice-inverted $\overline{UNCK}$ line 264, and a read status (RSTAT) line 266 that communicates to the read cascade controller whether or not the memory of the unit is completely empty. Read cascade controller 182 enables or disables the unload operation of load/unload control 152 through a read clock enable ($\overline{RCE}$) line 268. The interrelationships between write cascade control 180, read cascade control 182 and load/unload control 152 will be explained in further detail in conjunction with FIGS. 4 and 5.

A NAND gate 270 has as its inputs the $\overline{RXOC}$ signal line 240, an output enable control (OEC) line 272 and an $\overline{EMPTY}$ signal flag line 30 from flag decoder 146 (FIG. 2). In a normal, operating state of the FIFO, all inputs of NAND gate 270 are high, and thus NAND gate 270 will generate a low output on its output line 274. If input 224 is also low, output enable NOR gate will transmit a high state on its output line 104, and the data outputs of the memory unit in question will in response be enabled. If on the other hand the $\overline{EMPTY}$ flag 30, the $\overline{RXOC}$ signal line 240 or the output enable control line 272 is low, signal line 274 will be high, in turn causing the output enable line 104 to be low. The low state on control line 104 will in turn disable output buffer 102, and put the output bit lines 18 in tristate.

Referring now to FIG. 4, load/unload control block 152 is shown in more detail in the form of a schematic electrical diagram. The external LDCK signal is input on line 22 into an input 26 of an inverter 280. Inverter 280 has an output 282 that is connected to a $\overline{LDCK}$ signal line 252. Output 282 is further connected to an enable input of a transparent latch 284 and to the input of a second inverter 286. An output 288 of inverter 286 is connected to the $\overline{\overline{LDCK}}$ line 254. Node 288 is further connected to the input of a one-shot generator 290. One-shot generator 290 has a $\overline{Q}$ output that generates WRITE CLOCK pulses on output line 114.

The externally applied UNCK signal is input on line 24 to an input 28 of an inverter 292. An output node 294 of inverter 292 is coupled to the input of an enable input of a transparent latch 296 and to an input of a further inverter 298. Node 294 further originates $\overline{UNCK}$ signal line 264. An output node 300 of inverter 298 originates $\overline{\overline{UNCK}}$ signal line 264 and is further connected to an input of a one-shot generator 302. One-shot generator 302 is operable to produce a series of low-going pulses on its Q output, which is connected to $\overline{RCLK}$ line 134.

PEQ signal line 148 is received as an input 304 of an AND gate 306. Output 308 of AND gate 306 is connected to the "D" input of transparent latch 284. Responsive to a high input signal and an enabling signal, transparent latch 284 will transmit a low-going transition on its $\overline{Q}$ output, which is connected to a line 310. Line 310 is connected as an input to an AND gate 312, and is also the point of origin of the write status (WSTAT) signal line 256. Write clock enable signal line 258 from write cascade control 180 (FIGS. 1 and 5) is connected as a second input to AND gate 312. An output 314 of AND gate 312 is connected to an enabling terminal of one-shot generator 290.

PEQ line 148 is further connected as an input 316 of an AND gate 318. An output 320 of AND gate 318 is connected to the "D" input of transparent latch 296. Responsive to a high signal on its D input and an enabling signal from node 294, transparent latch 296 is operable to transmit a low-going transition on its $\overline{Q}$ output, which is connected to a node 322. Node 322 originates read status (RSTAT) line 266, which is input into read cascade controller 182 (FIG. 3). Node 322 is further connected as an input into an AND gate 324. A second input of AND gate 324 is connected to read clock enable ($\overline{RCE}$) line 268. An output 326 of AND gate 324 is connected to an enabling terminal of one-shot generator 302.

The $\overline{\text{WCLK}}$ signal is fed back on a line 328 to a "set" terminal of an S/R flip-flop 330. The $\overline{\text{RCLK}}$ signal is fed back on a line 332 to an input of an AND gate 334. An output 336 of AND gate 334 is input into a "reset" terminal of flip-flop 330. A Q output of flip-flop 330 is connected by a line 338 to a second input of AND gate 306. A $\overline{\text{Q}}$ output of flip-flop 330 is connected by a line 340 to a second input of AND gate 318.

The operation of the load/unload control 152 as shown in FIG. 4 will now be described. A LDCK pulse is input on line 22 to inverter 280, where it is inverted at node 282. Inverter 286 further inverts the $\overline{\text{LDCK}}$ pulse, such that a high-going transition is received by one-shot generator 290. If one-shot generator 290 is enabled, it will produce a negative-going $\overline{\text{WRITE CLOCK}}$ pulse on line 114, advancing the write pointer and selecting a memory location for a write operation.

In a similar manner, a high-going transition of the UNCK signal on line 24 will cause a low-going pulse to be generated by one-shot generator 302 on RCLK line 134, advancing the read pointer and selecting a memory location for a read operation. Both the $\overline{\text{WCLK}}$ pulse generated by one-shot generator 290 and the $\overline{\text{RCLK}}$ pulse generated by one-shot generator 302 are of a predetermined width.

The PEQ signal will be received on line 148 when either the memory is completely full or completely empty, as a high state of this signal indicates that the location of the read pointer is exactly equal to the location of the write pointer. This high state is input into inputs 304 and 316 of AND gates 306 and 318, respectively. Meanwhile, S/R flip-flop 330 has been keeping track of whether the last operation was a write operation or a read operation. If the last operation was a write, the relevant write clock pulse will have been input on line 328 to flip-flop 330, causing it to store a "one". Responsive to this, the Q output 338 of flip-flop 330 will be high, and the $\overline{\text{Q}}$ output 340 will be low. Since AND gate 306 then experiences both high inputs, it will generate a high output on line 308. When transparent latch 284 is enabled, it will store this high state and output a low state on line 310 responsive thereto. A low input to AND gate 312 will cause a low output on line 314, and this in turn will disable one-shot generator 290. In this manner, load/unload control disables the memory from responding to any further LDCK pulses.

If the last operation was a read operation, a low $\overline{\text{RCLK}}$ pulse will be fed back on line 332 to an input of AND gate 334. AND gate 334 will issue a low state on its output 336 responsive to either of its inputs 210 or 332 being low. Flip-flop 330 stores a "zero" responsive to a low-going transition on its reset input 336. A low state will then be output on line 338 and a high state output on line 340. Both inputs and AND gate 318 will be high, and therefore a high sate will be transmitted to transparent latch 296. If transparent latch 296 has been enabled, a low state will be transmitted on line 322 to AND gate 324. The appearance of a low state on one of AND gate 324's inputs will cause it to generate a low signal on its output 326. This low state will disable one-shot generator 302 form producing any further $\overline{\text{RCLK}}$ pulses, and thus the read pointer (130, 132 and 142 in FIG. 2) will be disabled from addressing the memory for read operations.

The $\overline{\text{RCLK}}$ one-shot generator 302 will further be disabled by the application of an $\overline{\text{MR}}$ low-going pulse on line 210 in much the same manner as a $\overline{\text{RCLK}}$ pulse. Further, a low level on read clock enable line 268 will likewise disable one-shot generator 302. In a similar manner, a low write clock enable signal on line 258 will disable write clock one-shot generator 290.

Turning now to FIG. 5, a detailed electrical schematic diagram is shown of write cascade controller 180. A first flip-flop 350 is clocked by a low-going state of control transfer input signal XI on line 190. A "D" input of flip-flop 350 is connected to a logical high level $V_H$ via a line 352. Flip-flop 350 may be set to store a "one" bit by a low-going signal on preset line 228. It may be reset to store a "zero" bit responsive to a low state on an output 354 from an AND gate 356. Reset line 234 is connected to a first input of AND gate 356, while a second input of AND gate 356 is connected via a line 358 to a write control signal ($\overline{\text{WXOC}}$) line 234. A "Q" output of flip-flop 350 is connected via a line 360 to a "D" input of a write control enable latch 362.

Latch 362 can be set to store a "one" bit by a low state of preset line 228, or can be reset to store a "zero" bit by a low state on reset line 234. $\overline{\text{LDCK}}$ signal line 252 is connected to the "enable" input of latch 362. When latch 362 is enabled, it will transmit a signal from its "Q" output on a line 364. Line 364 is the source of write control enable output line 258 and is further connected to an input of a write control NAND gate 366.

Further inputs of NAND gate 366 are connected to an HP8 signal line 162, an LP8 signal line 163, a twice-inverted LDCK signal line 254, and a write status (WSTAT) line 256. A final input of NAND gate 366 is connected by a line 368 to a "Q" output of a pointer signal latch 370. A "D" input of pointer signal latch 370 is connected by a line 372 to an AND gate 374. The two inputs of AND gate 374 are connected to HPS line 162 and LP8 line 163, respectively. Latch 370 is clocked by $\overline{\text{LDCK}}$ signal line 252, and can be reset by a low state appearing on $\overline{\text{MR}}$ line 206.

Read cascade control 182 is preferably similar in its construction to write cascade control 180, with only the inputs and outputs being different. FIG. 5 describes the structure of read cascade controller 182 when the following input and output substitutions are made as shown in FIG. 3: preset line 230 for preset line 228, $\overline{\text{XI}}$ line 186 for XI line 190, reset line 236 for reset line 234, HQ8 line 164 for HP8 line 162, LQ8 line 165 for LP8 line 163, $\overline{\text{MR}}$ line 208 for $\overline{\text{MR}}$ line 206, $\overline{\text{UNCK}}$ line 262 for $\overline{\text{LDCK}}$ line 252, $\overline{\text{UNCK}}$ 264 for $\overline{\text{LDCK}}$ line 254, RSTAT line 266 for WSTAT line 256, $\overline{\text{RXOC}}$ line 240 for $\overline{\text{WXOC}}$ output line 234, and $\overline{\text{RCE}}$ line 268 for $\overline{\text{WCE}}$ line 258.

The only further addition is that of an output enable control line 272 shown in phantom in FIG. 5. Output enable control line 272 is connected to line 360, and operates to enable or disable the read data outputs in a manner that has been described in connection with FIG. 3 above. For purposes of discussing the operation of the read cascade controller below, the equivalent of line 360 in read controller 182 is termed line 360R and the equivalent of line 368 in read controller 182 is termed line 368R.

Figure 6:
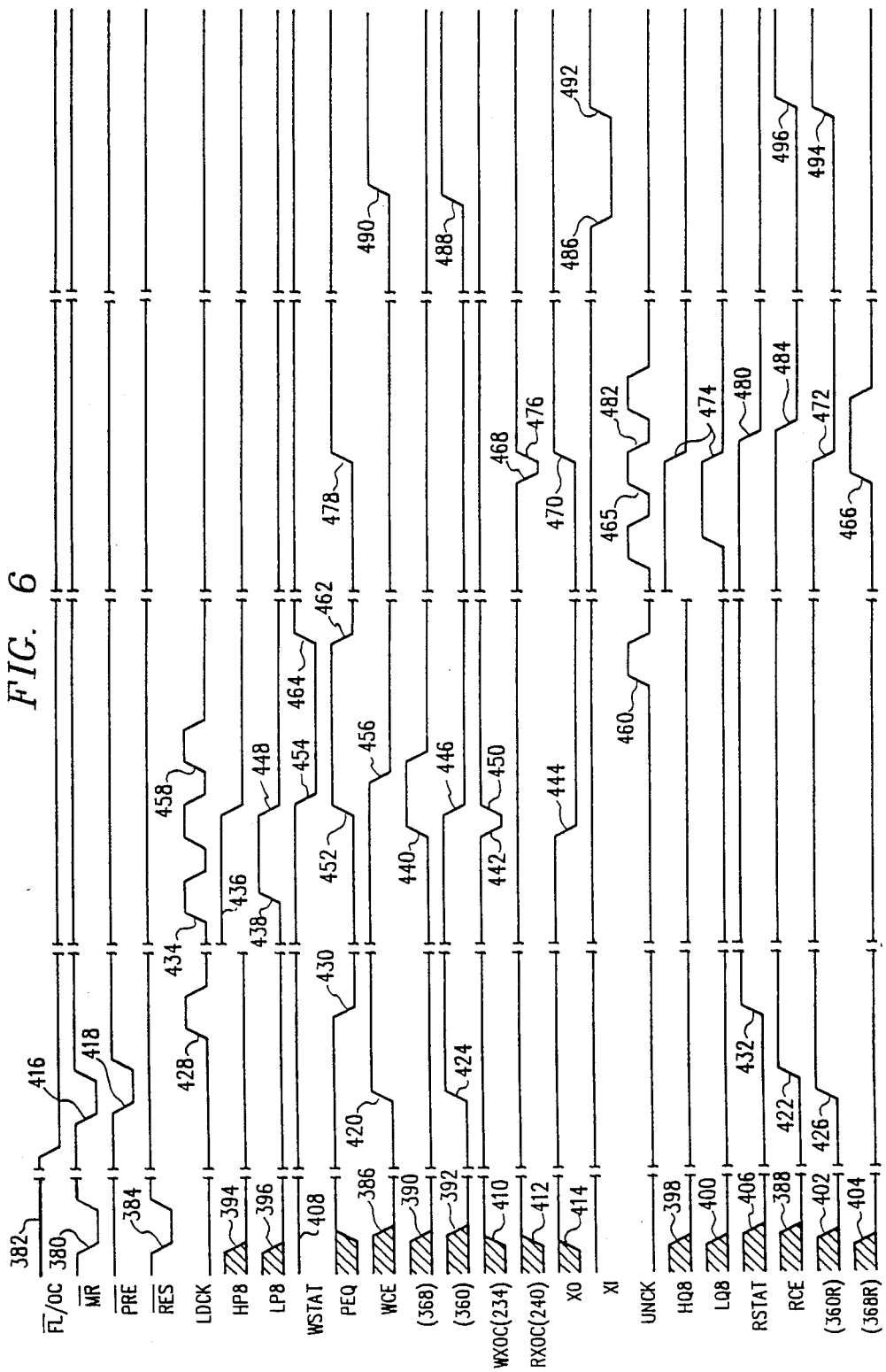
FIG. 6 is a timing diagram showing the operation of the FIFO memory illustrated in FIGS. 3 and 5.

Referring now to FIG. 6, the overall operation of a preferred FIFO memory according to the invention will be described in conjunction with FIGS. 3–5. The first portion in the timing chain shown in FIG. 6 illustrates the operation of a FIFO memory of the invention that has been configured as other than the first one in a multi-FIFO cascaded system, such as FIFOs 12 and 13 in FIG. 1. A low-going transition of an $\overline{\text{MR}}$ pulse occurs at 380. Referring to FIG. 1, this $\overline{\text{MR}}$ pulse will be transmitted to non-selected FIFO memories 12 and 13 directly, and will also be inverted by inverter 58. OR gate 56 will input a high state into the $\overline{FL}$/OC input 160 (FIG. 3) of FIFOs 12 and 13. This is shown on the $\overline{FL}$/OC plot at time 382. The $\overline{FL}$/OC high state at 160 will be inverted at node 218 (FIG. 3), and will further be inverted by inverter 220 to a high state on input 222 of NAND gate 204. Meanwhile, the $\overline{MR}$ low state on line 168 will be inverted by inverter 194 to a high state at node 196, which will be input into NAND gate 204. Responsive to high states on all of its inputs, NAND gate 204 will output a low state on its $\overline{RES}$ output 232 which is shown at time 384 on FIG. 6, and this low state is input into read cascade controller input 236 and write cascade controller input 234.

Referring now to FIG. 5, a low state on $\overline{RES}$ input 234 will reset write control enable latch 362 and will also cause the reset of XI flip-flop 350. Analogous latches in read cascade controller 182 are also reset. Responsive to flip-flop 350 and latch 362 storing low states, the write control enable signal $\overline{WCE}$ will also go low at time 386. Read control enable signal will similarly go low at time 388.

The low state of the $\overline{MR}$ signal will also be input on line 206 (FIG. 5) to reset pointer flip-flop 370. Since flip-flops 350 and 370 now store low states, the respective outputs 360 and 368 will also be low, as shown at times 390 and 392 on the FIG. 6 timing diagram. The low and high pointer shift registers 110, 112, 130 and 132 will also be reset to their lowest positions, and thus, the HP8, LP8, HQ8 and LQ8 signals will be low at times 394, 395, 398, 400. Outputs 360R and 368R in read cascade controller 182 will also go low at times 402 and 404.

Referring to FIG. 4, a low state on $\overline{MR}$ line 210 will cause AND gate 334 to transmit a low state to the reset input of S/R flip-flop 330. A high state will be transmitted on $\overline{Q}$ line 340, while a low state is transmitted on Q line 33B. Since the PEQ signal will at this point be high, AND gate 318 will transmit a high signal to latch 296. The UNCK signal on line 24 is low, and therefore, node 294 is high. Node 294 enables latch 296 to transmit a low state to node 322, and therefore, the RSTAT line 266 is low, as shown on FIG. 6 at time 406. AND gate 306 will however transmit a low state on its output 308. Latch 284 will therefore transmit a high state on line 310, and therefore the WSTAT signal on line 256 will be high as shown at 408 in FIG. 6.

In FIG. 3, $\overline{WXOC}$ signal line 234 and $\overline{RXOC}$ signal line 240 will be high since both the $\overline{LDCK}$ and $\overline{UNCK}$ signals will be low (FIGS. 4 and 5). The $\overline{WXOC}$ and $\overline{RXOC}$ high states are shown at times 410 and 412 in FIG. 6. Further, the output enable signal on line 272 (FIG. 3) will be low. Also, the XO signal will be high, as shown at time 414.

In the second portion of FIG. 6, the timing chain initiated by the $\overline{MR}$ low-going transition at time 416 is for a FIFO memory as configured to be the first one in a cascaded system, such as FIFO 11 in FIG. 1. The behavior of the FIFO responsive to the $\overline{MR}$ transition is the same as in the non-selected case, with the following differences.

Referring to FIG. 1, the $\overline{FL}$/OC signal as input on line 60 to FIFO 11 will be low. In FIG. 3, input 160 will therefore be low, and node 218 will be high. NAND gate 200 will transmit a low signal responsive to both of its inputs being high, and therefore flip-flop 350 and latch 362 (FIG. 5) in both the write cascade controller 180 and the read cascade controller 182 will be preset to each contain a "one" bit. This is shown at time 418 in FIG. 6. Responsive to latch 362 and its counterpart in the read cascade controller 182 going high, the $\overline{WCE}$ signal will go high at 420 and the $\overline{RCE}$ signal will go high at 422. Since latch 350 and its read controller counterpart contain a "one" bit, line 360 will go high at time 424 and line 360R will go high at 426.

The OEC signal on line 272 (FIG. 3) therefore will allow data to be read from a selected memory location where other conditions are met, such as a low state on output enable line 104.

After the selected memory has been preset to receive data, a series of LDCK pulses, such as a first LDCK pulse shown at time 428 on FIG. 6, may be input and acted upon by load/unload control 152 (FIG. 3). A $\overline{WCLK}$ pulse will be generated responsive thereto, and data will be written into a first memory location. The write pointer P will no longer be equal to the write pointer Q, and therefore the PEQ signal will go low at time 430. Referring to FIG. 4, since the PEQ signal goes low at input 316 to AND gate 318, a high state will appear at node 322, and thus, the read status signal RSTAT will go high at time 432 (FIG. 6). This indicates that read operations from the selected memory are now allowed.

Assume now that another 63 consecutive write operations have taken place with only the 63rd LDCK pulse shown after the discontinuity at time 434. The high-order write pointer signal HP8 will be high at time 436 since fifty-six or more writes have occurred. As the current address is being written into, the next address will be selected, and therefore, the LP8 signal will go high at time 438. On the 64th LDCK pulse, the signal on line 368 (FIG. 5) will go high at time 440 (FIG. 6) once register 370 has been clocked by a low-going transition of $\overline{LDCK}$. Responsive to line 368 going high, write transfer control signal $\overline{WXOC}$ will go low at time 442. Latch 238 (FIG. 3) will now be cleared, and a low signal will be generated on line 172 at time 444. By this transition, the write control is passed to the next FIFO in the system.

Since the write control signal $\overline{WXOC}$ went low and is fed back to AND gate 356 (FIG. 5), flip-flop 350 will be reset and therefore line 360 will go low at time 446.

On the same LDCK command, the lower-order write pointer LP8 will go low as at time 448, as the lower-order write pointer will be pointing to the first address digit rather than the eighth address digit. Since the HP8 and LP8 signals are no longer high, the write clock enable signal $\overline{WXOC}$ will go high at time 450. In FIG. 3, however, output node 244 will still stay high, and therefore, control signal XO will stay low.

The PEQ signal goes high again at time 452 since both the read and write pointers will be at their lowest positions. Since the PEQ signal is high, and the last operation recorded by latch 330 was a write operation, the write status signal WSTAT will go low at time 454, thereby disabling the loading of further data into the selected memory. At time 456, the write clock enable ($\overline{WCE}$) line 258 will go low responsive to $\overline{LDCK}$ going high on line 252 while line 360 is low (FIG. 5). $\overline{WCE}$ will stay low until output 360 is set high by either a low pulse on line 228, or by a low transition on input 190 where this high is passed to line 364 by a high level on line 252.

Referring to FIG. 4, a low state of $\overline{WCE}$ will cause AND gate 312 to issue a low state to the enabling input of one-shot generator 290, and will therefore disable one-shot generator 290 from transmitting further WRITE CLOCK pulses. The sixty-fifth 65th LDCK pulse shown at time 458 in FIG. 6 will be ignored by load/unload controller 152, but will be accepted by the next memory.

Next, assume that sixty-five consecutive UNCK pulses are delivered to load/unload controller 152 of the selected memory. The first of these is shown at time 460 in FIG. 6. The first unload operation from the memory causes write pointer P to not equal read pointer Q, and therefore the PEQ signal will go back low at time 462. Responsive to this, the write status signal will go high again at 464, enabling the memory to once again accept LDCK pulses once write control is returned to that memory unit. As explained above, this will not happen until the remaining FIFO's in the system have transferred write control in and out by the use of their XI and XO signals.

Assume now that the 64th consecutive UNCK has been received by load/unload control 152 at time 465 in FIG. 6. The output 368R (FIG. 5) from the read pointer flip-flop in read cascade controller 182 will go high in response to this at time 466. Since all inputs of the read cascade controller NAND gate (not shown; analogous to NAND gate 366 in FIG. 5), are now high, a low pulse will be issued on read control signal ($\overline{RXOC}$) line 240 (FIG. 3). A low state on $\overline{RXOC}$ line 240 at time 468 will cause node 244 (FIG. 3) to go from a high state to a low state, and thus, transfer control output signal XO will go high in response at time 470. Both write and read control have now been transferred to the next FIFO in the system.

Line 360R (not shown; analogous to line 360 in FIG. 5) will go low because the $\overline{RXOC}$ signal went low, and the XI flip-flop in read cascade controller 182 had therefore gone low. This happens at time 472. Since the read address pointer is no longer at the highest location, the higher-order and lower-order read pointers HQ8 and LQ8 will go low at time 474. Responsive to this, the $\overline{RXOC}$ signal line 240 (FIG. 3) will go high at time 476. The PEQ signal goes high at time 478, since the read and write pointers are now pointing to the same location. At time 480, the RSTAT signal line 266 will go low to signify that the memory is empty.

When the UNCK pulse signal goes back low at time 482, it will enable the RCLK enable latch (analogous to write clock enable latch 362 in FIG. 5) to store a "zero" input from the $\overline{XI}$ flip-flop. The output from the RCLK enable latch, signal $\overline{RCE}$, will therefore go low at time 484. In this condition, subsequent pulses of UNCK are ignored by the current memory.

In this manner, read and write control will be transferred through each FIFO unit in the chain or system until control is ready to be transferred back to the first FIFO. The transfer back into the current FIFO is shown in the rightmost portion of FIG. 6 and begins at time 486, where the XI input of the current FIFO goes low from the sixty-fourth load on the last FIFO in the chain. The XO output of the last FIFO is connected to the XI input of the first FIFO, as shown in FIG. 1. The low-going transition of the XI signal clocks flip-flop 350 as shown in FIG. 5. Flip-flop 350 is therefore enabled to store and transmit a high state on line 360 as shown at time 428 in FIG. 6. Since the LDCK signal is at this point low, the $\overline{RCE}$ latch 362 is enabled to store the high state input on line 360, and in turn transmits a high state on line 364 as shown at time 490.

Eventually, the last FIFO in the chain will transfer read control by a high-going transition on the XI input line 158 (FIG. 3) as shown at time 492. Responsive to a high state of XI, and therefore a low state of $\overline{XI}$, the $\overline{XI}$ flip-flop and read clock enable latch will store a high state, and lines 360R (FIG. 5) and the read clock enable line 268 (FIG. 3) will go high as shown at times 494 and 496. Unloads will now be accepted again by the first FIFO if any loads first occur.

Referring back to FIG. 5, the purpose for the connection of WSTAT line 256 as an input to NAND gate 366 is as follows. A low state of WSTAT will prevent the transfer of write control or loading to the next FIFO. The WSTAT signal will be low when a FULL condition occurs, the write pointer reaching location 64. This FULL condition occurs when, after an $\overline{MR}$ pulse, the FIFO accepts 64 loads, then accepts 63 unloads, and then performs 63 more loads.

In a similar manner, the read status signal line 266 (FIG. 3) is connected to the NAND gate (not shown) of read cascade controller 182 in order to prevent the transfer of unloading control to the next FIFO when an empty condition occurs as read pointer reaches location 64. This latter condition occurs when, after an $\overline{MR}$ pulse, the FIFO accepts 64 loads, then 63 unloads, then 63 more loads, and then finally 64 more unloads.

In summary, a cascadable first-in, first-out memory system has been described that provides for a simple method of transferring write and read control between the memory units in the system. A single transfer control signal (XI/XO) is used to transfer this write and read control on sequential opposed transitions of the signal. Combination first load and master reset circuitry is provided to select one of the memory units as the one in which read and write operations will be initiated, the remaining FIFO memory units being put into tristate. The first load/reset feature also incorporates an output control feature whereby data outputs from the FIFO system may be inactivated independently of the reset function and of the external write and read commands.

While preferred embodiments of the present invention and their advantages have been set out in the above detailed description, the invention is not limited thereto, but only by the spirit and scope of the appended claims.

What is claimed is:

1. A cascaded first-in, first-out memory system comprising:
    a first first-in, first-out memory;
    a second first-in, first-out memory cascaded to said first first-in first-out memory;
    a controller for enabling write operations responsive to a first transition of a control transfer input signal and for enabling read operations responsive to a second transition of said control transfer input signal, said second transition being of opposite polarity from said first transition;
    said controller operable to transmit a first transition of a control transfer output signal to said second first-in, first-out memory responsive to a first predetermined state in said first first-in, first-out memory, and operable to transmit a second transition of said control transfer output signal of opposite polarity to the last said first transition to said second first-in, first-out memory responsive to a second predetermined state in said first first-in, first-out memory, such that said second first-in, first-out memory will be enabled to perform write operations after receiving said first transition of said output signal and will be enabled to perform read operations after receiving said second transition of said output signal.

2. The cascaded first-in, first-out memory system of claim 1, wherein said controller is operable to disable write operations in said first first-in, first-out memory responsive to said first predetermined state, and is operable to disable read operations in said first first-in, first-out memory responsive to said second predetermined state.

3. The cascaded first-in, first-out memory system of claim 1, and further comprising:

initializing means for placing said memory system in an initial write condition and for placing said memory in an initial read condition;

a counter for counting the number of write operations performed since the initial write condition, and for counting the number of read operations performed since the initial read condition, said counter causing the generation of said first predetermined state responsive to counting a predetermined number of write operations, said counter causing the generation of said second predetermined state responsive to counting a predetermined number of read operations.

4. The cascaded first-in, first-out memory system of claim 3, and further comprising:

a memory array having a plurality of memory locations, said predetermined number of write operations and said predetermined number of read operations equalling said plurality of memory locations.

5. The first-in, first-out memory system of claim 3, wherein said counter continues to count the number of write operations since said memory system was in an initial write condition regardless of whether there are read operations intervening between said write operations, said counter continuing to count the number of read operations since said memory system was in an initial read condition regardless of whether there are write operations intervening between read operations.

6. The cascaded first-in, first-out memory system of claim 3, wherein said counter is operable to place said memory system in said initial write condition responsive to counting said predetermined number of write operations, said counter operable to place said memory system in said initial read condition responsive to counting said predetermined number of read operations.

7. In a cascaded memory system having a plurality of memory units including a last memory unit, current memory unit and a next memory unit, said memory units each operable to have data written thereinto responsive to attaining a write control state and operable to have data read therefrom responsive to attaining a read control state, a control transfer circuit provided for said current memory unit, comprising:

a write controller for receiving a first transition of a control transfer input signal from said last memory unit and storing said write control state responsive thereto;

a read controller for receiving a second transition of said control transfer input signal of opposite polarity from said first transition and storing said read control state responsive thereto;

said write controller negating said write control state and generating a first transition of a control output signal for transmission to said next memory unit responsive to a first predetermined condition occurring in said current memory unit;

said read controller negating said read control state and generating a second transition of said control output signal of opposite polarity from said first transition of said control output signal responsive to a second predetermined condition occurring in said current memory unit whereby write and read control is transferred from said last memory unit to said current memory unit and thence to said next memory unit.

8. The control transfer circuit of claim 7, and further comprising:

an initializer for placing said current memory unit in an initial write condition and an initial read condition;

a counter for counting the number of write operations performed since the initial write condition and causing the generation of said first predetermined condition responsive to counting a predetermined number of write operations;

said counter counting the number of read operations since the initial read condition and causing the generation of said second predetermined condition responsive to counting a predetermined number of read operations.

9. The control transfer circuit of claim 8, wherein said counter is operable to return said current memory unit to said initial write condition responsive to counting said predetermined number of write operations, said counter returning said current memory unit to said initial read condition responsive to counting said predetermined number of read operations.

10. The transfer control circuit of claim 7, and further comprising:

a write control state register of said write controller operable to store said write control state responsive to said write controller receiving said first transition of said control transfer input signal;

a write operation enable register coupled to said write control state register for sensing said stored write control state and operable to transmit a write operation enable signal responsive thereto;

means for placing said current memory unit in an initial write condition, a counter for generating a write pointer signal responsive to counting a predetermined number of write operations since said initial write condition;

a write pointer signal register operable to store and output said write pointer signal;

a write control transfer output signal generator coupled to said write operation enable register and said write pointer signal register, said generator receiving said write operation enable signal and said write pointer signal and operable to generate a write control transfer output signal responsive thereto; and a control transfer output signal generator coupled to said write control transfer output signal generator for generating said first transition of said control transfer output signal responsive to receiving said write control transfer output signal.

11. The control transfer circuit of claim 10, and further comprising:

a write operation signal generator for generating a write operation signal responsive to an externally input write operation command signal and said write operation enable signal, a memory of said current memory unit operable to receive and store data responsive to said write operation signal.

12. The control transfer circuit of claim 11, and further comprising:
  a write status signal generator for generating a write status signal responsive to said current memory unit being full, said write status signal input into said write control transfer output signal generator, said write control transfer output signal generator disabled from generating said write control transfer output signal responsive to said write status signal.

13. The transfer control circuit of claim 7, and further comprising:
  a read control state register of said read controller operable to store said read control state responsive to said read controller receiving said second transition of said control transfer input signal;
  a read operation enable register coupled to said read control state register for sensing said stored read control state and operable to transmit a read operation enable signal responsive thereto;
  means for placing said current memory unit in an initial read condition, a counter for generating a read pointer signal responsive to counting a predetermined number of read operations since said initial read condition;
  a read pointer signal register operable to store and output said read pointer signal;
  a read control transfer output signal generator coupled to said read operation enable register and said read pointer signal register, said read control transfer output signal generator receiving said read operation enable signal and said read pointer signal and operable to generate a read control transfer output signal responsive thereto; and
  a control transfer output signal generator coupled to said read control transfer output signal generator for generating said second transition of said control transfer output signal responsive to receiving said read control transfer output signal.

14. The transfer control circuit of claim 13, and further comprising:
  a read operation signal generator for generating a read operation signal responsive to an externally input read operation command signal and said read operation enable signal, a memory of said current memory unit operable to transmit data responsive to said read operation signal.

15. The control transfer circuit of claim 14, and further comprising:
  a read status signal generator for generating a read status signal responsive to said current memory unit being empty, said read status signal input into said read control transfer output signal generator, said read control transfer output signal generator disabled from generating said read control transfer output signal responsive to receiving said read status signal.

16. In a cascaded memory system having a plurality of memory units including a first unit and other units, each unit operable to have data written thereinto responsive to a stored predetermined control state and operable to have data read therefrom responsive to a second stored predetermined control state and an output enabling state thereof, an initialization and output control circuit comprising:
  a first circuit operable to cause said first unit to store said first and second predetermined control states and to cause said other units not to store said first and second predetermined control states, all responsive to an external reset signal; and
  a second circuit operable to cause each of said memory units not to be in said output enabling state responsive to an external output control signal.

17. The cascaded memory system of claim 16, and further comprising:
  an external write command source and an external read command source both coupled to each memory unit and both different from said first and second circuits;
  said first predetermined control state enabling a selected memory unit to generate a write operation signal responsive to an external write command, said second predetermined control state enabling a selected memory unit to generate a read operation signal responsive to an external read command;
  each memory unit having a memory for receiving said write and read operation signals, said memory receiving and storing data responsive to said write operation signal, said memory transmitting data responsive to said read operation signal.

18. A first-in, first-out memory unit adaptable to be incorporated into a cascaded memory system, comprising:
  a memory for storing data therein;
  a read/write controller for performing write operations to write data into said memory and for performing read operations to read data from said memory;
  a control circuit coupled to said read/write controller and a plurality of data outputs of said memory, said control circuit receiving a master reset signal line and a first load/output control signal line;
  said control circuit enabling write operations into said memory responsive to a first state of said master reset line and a first state of said first load/output control line;
  said control circuit disabling write operations into said memory responsive to said first state of said first master reset line and a second state of said first load/output control line;
  said control circuit enabling read operations from said memory responsive to a first state of said master reset line and a first state of said first load/output control line; and
  said control circuit disabling read operations from said memory responsive to said first state of master reset line and second state of said first load/output control line.

19. A method for transferring control among a plurality of cascaded memories including a first memory, a next memory, and a last memory which may be the same as the next memory, the method comprising the steps of:
  initializing the first memory to be in an enabled condition and the remainder of the memories to be in a disabled condition;
  performing a plurality of write operations into said enabled memory;
  performing a plurality of read operations from said enabled memory;
  disabling the first memory from performing write operations responsive to the occurrence of a first predetermined condition therein;
  transmitting a first transition of a control transfer signal to the next memory responsive to the predetermined condition;

enabling the next memory to perform write operations responsive to the first transition;

disabling the first memory from performing read operations responsive to the occurrence of a second predetermined condition therein;

transmitting a second transition of the control transfer signal of opposite polarity to said first transition to the next memory responsive to the second predetermined condition;

enabling the next memory to perform read operations responsive to the second transition;

repeating the above steps of performing, disabling, transmitting and enabling for each memory in the cascaded chain receiving a first transition of a control transfer signal by the first memory from the last memory;

enabling the first memory to perform write operations responsive to receiving the first transition;

receiving a second transition of the control transfer signal of opposite polarity to the last said first transition by the first memory from the last memory; and enabling the first memory to perform read operations responsive to receiving the last said second transition.

20. The method of claim 19, and further comprising the steps of:

counting the number of write operations that have occurred since the first memory was enabled to perform write operations;

satisfying the first predetermined condition upon counting a number of write operations equal to a first predetermined number;

counting the number of read operations that have occurred since the first memory was enabled to perform read operations;

satisfying the second predetermined condition upon counting a number of read operations equal to a second predetermined number.

21. The method of claim 20, wherein each said memory has a plurality of memory locations, the first and second predetermined numbers each equalling said plurality of memory locations.

22. The method of claim 19, and further including the steps of:

resetting each of the memories using a master reset signal; and selectively disabling the output of each of said memories responsive to an output signal separate from said reset signal.

23. The method of claim 22, wherein said master reset signal and said output control signal are used to initially enable the first memory and to initially disable the remainder of the memories.

24. The memory unit of claim 18, wherein:

said control circuit disabling said data outputs responsive to said first state of said first load/output control line; and said control circuit enabling said data outputs of said memory responsive to said second state of said first load/output control line.

* * * * *

UNITED STATES PATENT AND TRADEMARK OFFICE
CERTIFICATE OF CORRECTION

PATENT NO. : 4,839,866

DATED : June 13, 1989

INVENTOR(S) : Morris D. Ward and Kenneth L. Williams

It is certified that error appears in the above-identified patent and that said Letters Patent is hereby corrected as shown below:

Claim 5, line 1, after "The" but before "first-in" insert --cascaded--.

Column 23, Claim 19, line 15, change "chain" to --chain;--.

Signed and Sealed this

Twentieth Day of February, 1990

Attest:

JEFFREY M. SAMUELS

*Attesting Officer*       *Acting Commissioner of Patents and Trademarks*